US012253841B2

(12) United States Patent
Nishiyama et al.

(10) Patent No.: US 12,253,841 B2
(45) Date of Patent: Mar. 18, 2025

(54) UNIT, UNIT CONTROL METHOD, AND NON-TRANSITORY COMPUTER-READABLE RECORDING MEDIUM

(71) Applicant: OMRON Corporation, Kyoto (JP)

(72) Inventors: Yoshihide Nishiyama, Yokohama (JP); Yuta Nagata, Kusatsu (JP)

(73) Assignee: OMRON Corporation, Kyoto (JP)

( * ) Notice: Subject to any disclaimer, the term of this patent is extended or adjusted under 35 U.S.C. 154(b) by 671 days.

(21) Appl. No.: 17/439,814

(22) PCT Filed: Feb. 18, 2020

(86) PCT No.: PCT/JP2020/006275
§ 371 (c)(1),
(2) Date: Sep. 16, 2021

(87) PCT Pub. No.: WO2020/195351
PCT Pub. Date: Oct. 1, 2020

(65) Prior Publication Data
US 2022/0179385 A1    Jun. 9, 2022

(30) Foreign Application Priority Data

Mar. 27, 2019  (JP) ................................ 2019-061199

(51) Int. Cl.
*G05B 19/05*  (2006.01)
(52) U.S. Cl.
CPC ......... *G05B 19/052* (2013.01); *G05B 19/054* (2013.01); *G05B 2219/1128* (2013.01); *G05B 2219/15018* (2013.01)
(58) Field of Classification Search
CPC .... G05B 19/052; G05B 19/054; G05B 19/05; G06F 21/14; H04L 61/59
See application file for complete search history.

(56) References Cited

U.S. PATENT DOCUMENTS 8,170,694 B2 *  5/2012  Nakamura ........ H04L 12/40032
700/20
8,341,720 B2 * 12/2012  Ben-Yochanan ... H04L 63/0227
713/153
(Continued)

FOREIGN PATENT DOCUMENTS

CN        103190119         7/2013
CN       105556403 X        5/2016
(Continued)

OTHER PUBLICATIONS

Tatsuo Nakajima et al., "A Virtual Overlay Network for Integrating Home Appliances", Proceedings of the 2002 Symposium on Applications and the Internet (SAINT'02), Jan. 2002, pp. 1-8. (Year: 2002).*
"Office Action of China Counterpart Application", issued on Dec. 6, 2023, with English translation thereof, p. 1-p. 24.
Tatsuo Nakajima et al., "A Virtual Overlay Network for Integrating Home Appliances", Proceedings of the 2002 Symposium on Applications and the Internet (SAINT'02), Jan. 2002, pp. 1-8.
(Continued)

*Primary Examiner* — Alex H. Tran
(74) *Attorney, Agent, or Firm* — JCIPRNET

(57) ABSTRACT

Provided is a technology with which it is possible to access a function unit to be accessed without ascertaining an IP address of the function unit. Provided is a unit comprising: a communication unit for relaying a communication between an external device connected to a first network and another unit connected to a second network; a setting unit for acquiring address information of the other unit in the second network from the other unit and generating setting information in which the address information is associated with an identifier which substitutes for the address information; and a link information generation unit for generating, on the basis of the identifier, link information used to access information on the other unit from the external device.

12 Claims, 18 Drawing Sheets

(56) References Cited

U.S. PATENT DOCUMENTS

| | | | | |
|---|---|---|---|---|
| 8,880,644 | B2* | 11/2014 | Menjo | H04L 45/74 |
| | | | | 709/219 |
| 9,423,789 | B2* | 8/2016 | Cornett | G05B 19/4185 |
| 9,596,263 | B1* | 3/2017 | Brooker | H04L 9/0625 |
| 10,356,046 | B2* | 7/2019 | Southerland | H04L 63/166 |
| 10,841,275 | B2* | 11/2020 | Worley | H04L 69/22 |
| 11,392,673 | B2* | 7/2022 | Brown | G06F 16/9577 |
| 11,818,218 | B2* | 11/2023 | Ferrara | H04L 67/02 |
| 2003/0046576 | A1 | 3/2003 | High, Jr. et al. | |
| 2008/0263216 | A1 | 10/2008 | Jacob et al. | |
| 2010/0114333 | A1* | 5/2010 | Otokozawa | H04L 69/08 |
| | | | | 709/230 |
| 2013/0212215 | A1 | 8/2013 | Ukkola et al. | |
| 2014/0082117 | A1 | 3/2014 | Unhale et al. | |
| 2015/0052258 | A1* | 2/2015 | Johnson | H04L 63/0281 |
| | | | | 709/228 |
| 2016/0277413 | A1 | 9/2016 | Ajitomi et al. | |

FOREIGN PATENT DOCUMENTS

| | | |
|---|---|---|
| JP | 2008250473 | 10/2008 |
| JP | 2016194808 | 11/2016 |
| WO | 2007055046 | 5/2007 |

OTHER PUBLICATIONS

"Office Action of Europe Counterpart Application", issued on Jun. 14, 2023, p. 1-p. 6.

"Search Report of Europe Counterpart Application", issued on Oct. 6, 2022, p. 1-p. 8.

"International Search Report (Form PCT/ISA/210) of PCT/JP2020/006275," mailed on Apr. 7, 2020, with English translation thereof, pp. 1-4.

"Written Opinion of the International Searching Authority (Form PCT/ISA/237) of PCT/JP2020/006275," mailed on Apr. 7, 2020, with English translation thereof, pp. 1-6.

* cited by examiner (S10)
ProxyInfo

```
<proxy enable="true">
 <info
     domain="AI"
     unit="#2"
     host="unit_2"
 />
</proxy>
```

FIG. 9

(S32)
Database information   LinkInfo
```
<html>
  <a href="http://192.168.250.2/u3/App31/index.php >   ─31
    Database information  ─32
  </a>
</html>
```
─30

FIG. 12

UNIT, UNIT CONTROL METHOD, AND NON-TRANSITORY COMPUTER-READABLE RECORDING MEDIUM

CROSS-REFERENCE TO RELATED APPLICATION

This application is a 371 application of the International PCT application serial no. PCT/JP2020/006275, filed on Feb. 18, 2020, which claims the priority benefits of Japan Patent Application No. 2019-061199, filed on Mar. 27, 2019. The entirety of each of the above-mentioned patent applications is hereby incorporated by reference herein and made a part of this specification.

BACKGROUND

Technical Field

The disclosure relates to a technology for relaying communication with an external device in a control system composed of a plurality of units.

Description of Related Art

At a production site or the like using FA (Factory Automation), a control unit such as a PLC (Programmable Logic Controller) is used in controlling various facilities and various devices arranged in each facility. In recent years, control units that can be connected to external devices have become widespread. Regarding such control units, Patent Document 1 (Japanese Laid-Open No. 2016-194808) discloses a PLC that can access a database of an external device.

RELATED ART

Patent Document

[Patent Document 1] Japanese Laid-Open No. 2016-194808

SUMMARY

Problems to be Solved

Various function units may be connected to the control unit. In order to realize communication from the external device to each function unit, the user needs to know the IP address of the function unit of the access destination. It becomes more difficult to grasp the IP address as the number of function units connected increases. Therefore, there is a demand for a technology that can access a target function unit without ascertaining the IP address of the function unit of the access destination.

Means for Solving the Problems

In one example of the disclosure, a unit connectable to a PLC (Programmable Logic Controller) is provided. The unit includes: a communication unit for relaying communication between an external device connected to a first network and an other unit connected to a second network; a setting unit for acquiring address information of the other unit in the second network from the other unit, and generating setting information in which the address information is associated with an identifier that substitutes for the address information; and a link information generation unit generating link information used for accessing information in the other unit from the external device based on the identifier.

According to the disclosure, the user can access the other unit without ascertaining the address information of the other unit in the second network.

In one example of the disclosure, the communication unit: based on receiving a first access request that is generated by the external device based on the link information from the external device, acquires the identifier included in the first access request, acquires the address information corresponding to the identifier with reference to the setting information, and accesses information in the other unit based on a second access request including the address information.

According to the disclosure, the unit can access the other unit based on the address information corresponding to the access request included in the first access request. As a result, the address information of the other unit in the second network is concealed from the external device belonging to the first network.

In one example of the disclosure, the communication unit generates the second access request by replacing the identifier included in the first access request with the address information.

According to the disclosure, the unit can rewrite the first access request valid in the first network to the second access request valid in the second network. As a result, the address information of the other unit in the second network is concealed from the external device belonging to the first network.

In one example of the disclosure, the unit is connected to the other unit by a bus, and the communication unit communicates with the other unit by using the bus.

According to the disclosure, the unit can communicate with the other unit via the bus.

In one example of the disclosure, the unit further includes a communication port that is physical, and the communication unit communicates with the external device by using the communication port.

According to the disclosure, the unit can communicate with the other unit via the physical communication port.

In one example of the disclosure, the link information includes a hyperlink, and the communication unit displays the hyperlink on the external device.

According to the disclosure, the user can access the other unit via the hyperlink.

In another example of the disclosure, a control method for a unit connectable to a PLC is provided. The control method includes: a step of relaying communication between an external device connected to a first network and an other unit connected to a second network; a step of acquiring address information of the other unit in the second network from the other unit, and generating setting information in which the address information is associated with an identifier that substitutes for the address information; and a step of generating link information used for accessing information in the other unit from the external device based on the identifier.

According to the disclosure, the user can access the other unit without ascertaining the address information of the other unit in the second network.

In another example of the disclosure, a non-transitory computer-readable recording medium, recording a control program for a unit connectable to a PLC is provided. The control program causes the unit to execute: a step of relaying communication between an external device connected to a first network and an other unit connected to a second network; a step of acquiring address information of the other unit in the second network from the other unit, and generating setting information in which the address information is associated with an identifier that substitutes for the address information; and a step of generating link information used for accessing information in the other unit from the external device based on the identifier.

According to the disclosure, the user can access the other unit without ascertaining the address information of the other unit in the second network.

BRIEF DESCRIPTION OF THE DRAWINGS

FIG. 9 is a diagram showing an example of proxy information transmitted in step S10 of FIG. 8.

FIG. 12 is a diagram showing link information generated in step S32 of FIG. 11.

DESCRIPTION OF THE EMBODIMENTS

Figure 1:
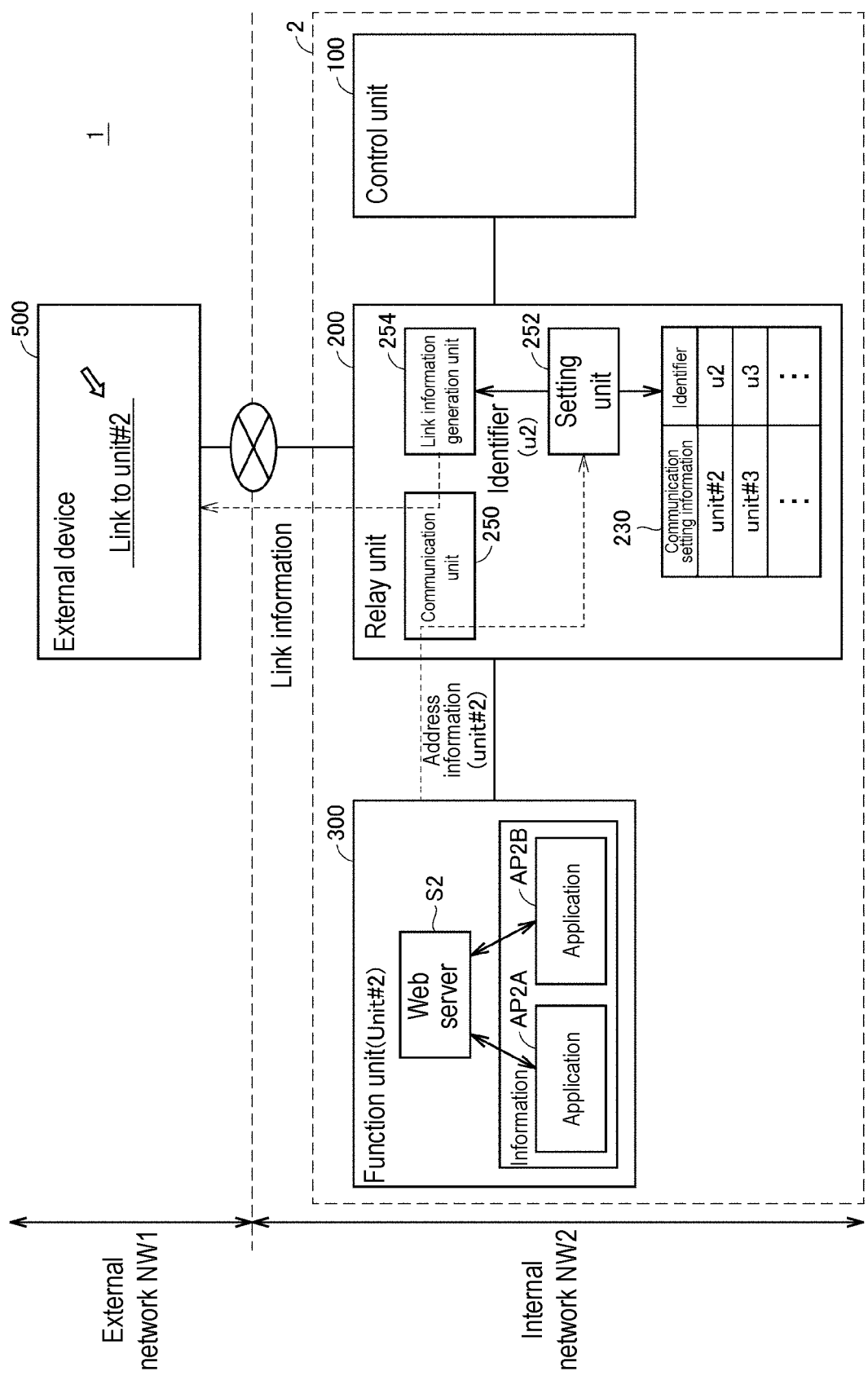
FIG. 1 is a diagram showing a configuration example of an information processing system according to an embodiment.

Hereinafter, embodiments according to the invention will be described with reference to the drawings. In the following description, the same parts and elements are designated by the same reference numerals. These parts and elements also have the same names and functions. Therefore, the detailed description of these parts and elements will not be repeated.

A. Application Example

An application example of the invention will be described with reference to FIG. 1. FIG. 1 is a diagram showing a configuration example of an information processing system 1 according to an embodiment.

The information processing system 1 includes one or more control systems 2 and one or more external devices 500. The control system 2 is an FA system for automating a production process. The control system 2 includes a control unit 100, a relay unit 200, and a function unit 300.

The relay unit 200 and the external device 500 are connected to an external network NW1. Communication between the relay unit 200 and the external device 500 is realized by Ethernet (registered trademark). That is, each of the relay unit 200 and the external device 500 is assigned with a valid IP address in the external network NW1, and the relay unit 200 and the external device 500 communicate with each other based on the IP address.

The control unit 100, the relay unit 200, and the function unit 300 are connected to an internal network NW2. Communication between these units is realized by, for example, Ethernet. That is, each unit constituting the control system 2 is assigned with a valid IP address in the internal network NW2, and each unit communicates with each other based on the IP address.

The control unit 100 is, for example, a PLC. The control unit 100 controls a drive device (not shown) according to a user program designed in advance. The drive device includes various industrial devices for automating the production process. As an example, the drive device includes a robot controller, a servo driver, an arm robot controlled by the robot controller, a servo motor controlled by the servo driver, etc. Further, the drive device may include a visual sensor for photographing a workpiece, other devices used in the production process, etc.

The function unit 300 provides various functions for realizing control for various control targets with the control unit 100. The function unit 300 includes a Web server S2 and applications AP2A and AP2B. The applications AP2A and AP2B are programs for providing various services related to the control system 2.

The external device 500 is, for example, a notebook type or desktop type PC (Personal Computer), a tablet terminal, a smartphone, an HMI (Human Machine Interface), or other information processing terminals.

The relay unit 200 relays communication between a device (that is, the external device 500) connected to the external network NW1 and a device (that is, the control unit 100 and the function unit 300) connected to the internal network NW2. The relay unit 200 includes a communication unit 250, a setting unit 252, and a link information generation unit 254 as a functional configuration for realizing a communication relay function.

The communication unit 250 is a communication module for realizing communication with various devices. Typically, the communication unit 250 realizes communication with the external device 500 connected to the external network NW1 (first network), and communication with another unit (for example, the function unit 300) connected to the internal network NW2 (second network).

The setting unit 252 acquires address information of the function unit 300 in the internal network NW2 from the function unit 300. The address information is communication information capable of uniquely identifying the function unit 300 in the internal network NW2. As an example, the address information is an IP address, a domain name or a host name.

The setting unit 252 generates an identifier that substitutes for the address information based on receiving the address information from the function unit 300. The identifier is, for example, an arbitrary character string. The setting unit 252 associates the address information received from the function unit 300 with the generated identifier, and writes these in communication setting information 230.

The link information generation unit 254 generates link information used for accessing information in the function unit 300 connected to the internal network NW2 from the external device 500 connected to the external network NW1 based on the identifier generated by the setting unit 252. The "information in the function unit 300" means arbitrary information stored in the function unit 300, and is a concept including a program (application) and data. The "link information" is an address indicating an access destination to the information in the function unit 300, and is, for example, a URL or a hyperlink. The link information generation unit 254 embeds the generated link information in an HTML (HyperText Markup Language) document, and then transmits the HTML document to the external device 500.

The external device 500 displays a screen corresponding to the HTML document received from the relay unit 200. As a result, the link information is displayed on the screen of the external device 500. By clicking the displayed link information, the user can access the information of the access destination indicated by the link information. At this time, the user does not need to ascertain the IP address of the function unit 300 which is the access destination.

Further, the link information displayed on the external device 500 only includes the identifier of the function unit 300 in the external network NW1, and does not include the IP address of the function unit 300 in the internal network NW2. That is, the IP address of the function unit 300 in the internal network NW2 is not disclosed to the external device 500. As a result, the function unit 300 belonging to the internal network NW2 is concealed. In addition, direct communication between the external device 500 and the function unit 300 is prevented, and the security risk associated with the communication is reduced.

B. Control System 2

Figure 2:
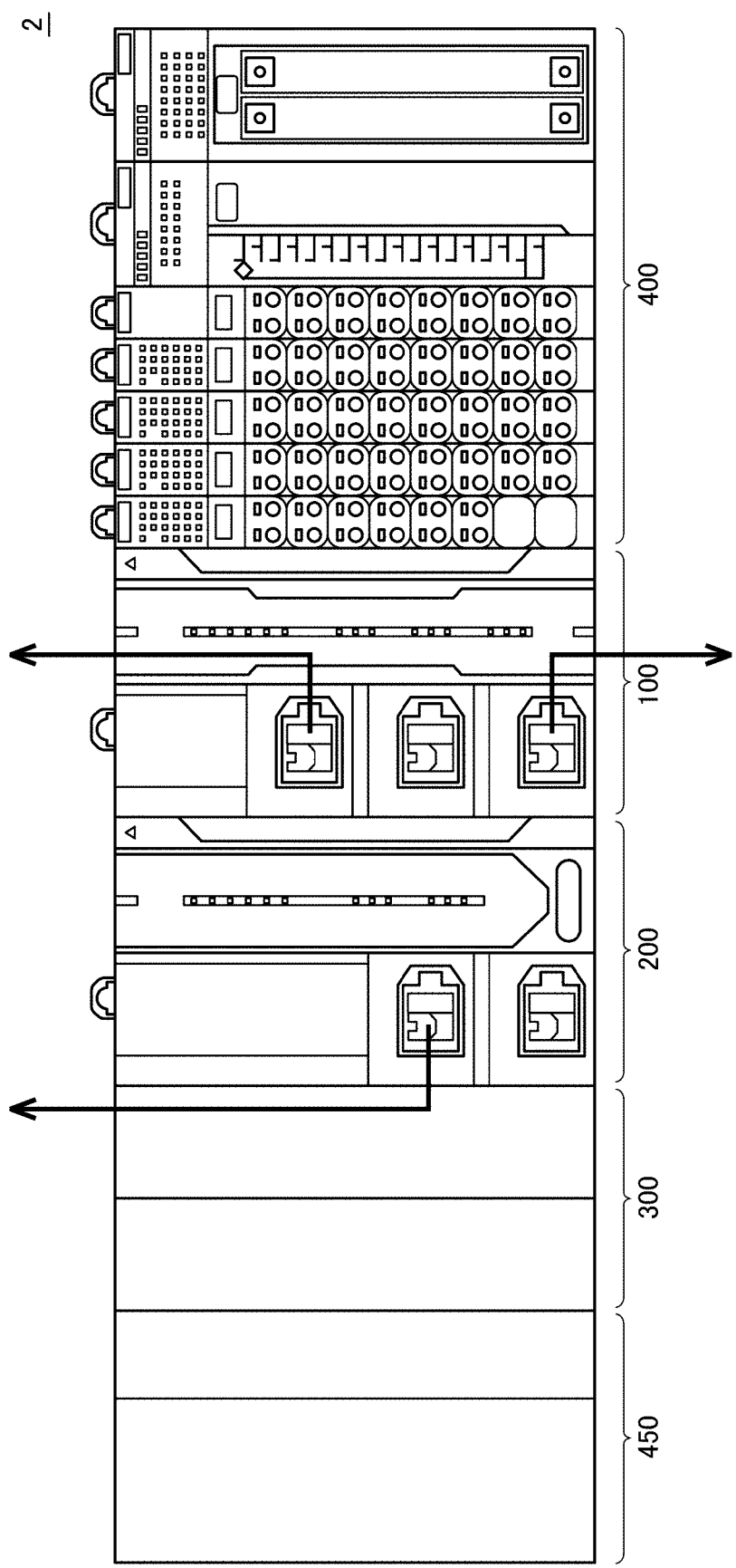
FIG. 2 is an external view showing a configuration example of a control system according to an embodiment.

The control system 2 shown in FIG. 1 will be described with reference to FIG. 2. FIG. 2 is an external view showing a configuration example of the control system 2.

With reference to FIG. 2, the control system 2 includes one or a plurality of control units 100, one or a plurality of relay units 200, one or a plurality of function units 300, one or a plurality of function units 400, and a power supply unit 450.

The control unit 100 and the relay unit 200 are connected via an arbitrary data transmission path. The control unit 100, the relay unit 200, and one or a plurality of function units 300 and 400 are connected via an internal bus 10 (see FIG. 7) described later.

The control unit 100 executes a central process in the control system 2. The control unit 100 executes a control operation for controlling a control target according to an arbitrarily designed requirement specification. In the configuration example shown in FIG. 2, the control unit 100 has one or a plurality of communication ports. The control unit 100 corresponds to a process execution unit that executes standard control according to a standard control program.

The relay unit 200 is connected to the control unit 100 and is in charge of a communication function with other devices. In the configuration example shown in FIG. 2, the relay unit 200 has one or a plurality of communication ports. Details of the communication function provided by the relay unit 200 will be described later.

The function unit 300 is an optional unit, and is connected to the control unit 100 as required. The function unit 300 may typically include an SGU (Security Guard Unit), a communication unit having a data exchange function by OPC UA (Object Linking and Embedding for Process Control Unified Architecture), an AI unit having a preventive maintenance function by AI (Artificial Intelligence), etc.

The function unit 400 provides various functions for realizing control for various control targets with the control system 2. The function unit 400 may typically include an I/O unit, a safety I/O unit, a communication unit, a motion controller unit, a temperature adjustment unit, a pulse counter unit, etc. As the I/O unit, for example, a digital input (DI) unit, a digital output (DO) unit, an analog input (AI) unit, an analog output (AO) unit, a pulse catch input unit, and a composite unit in which a plurality of types are mixed can be mentioned. The safety I/O unit is in charge of an I/O process related to safety control.

The power supply unit 450 supplies power of a predetermined voltage to each unit constituting the control system 2.

C. Hardware Configuration Example of Each Unit

Next, a hardware configuration example of each unit constituting the control system 2 according to the present embodiment will be described.

(c1: Control unit 100)

Figure 3:
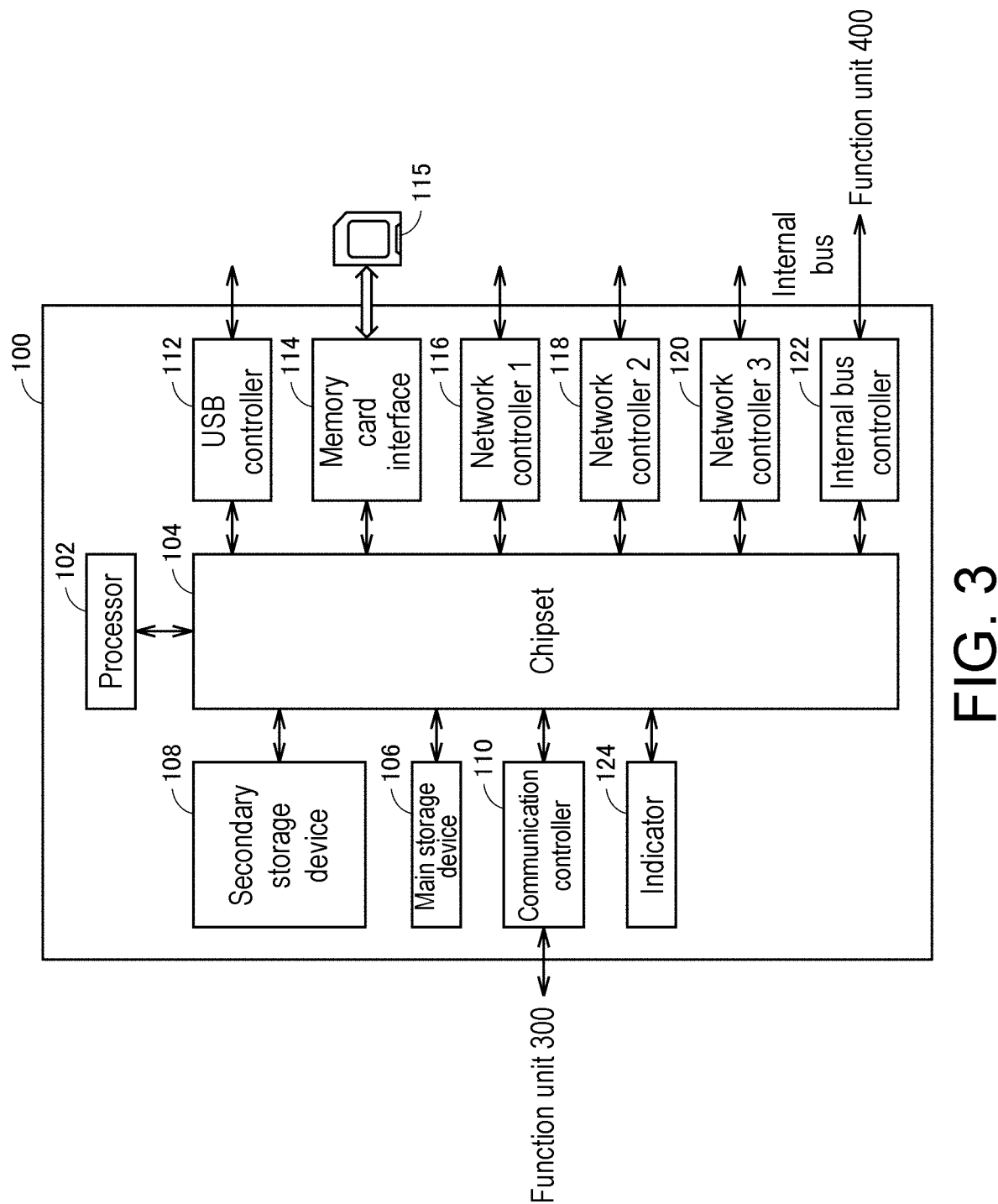
FIG. 3 is a schematic diagram showing a hardware configuration example of a control unit constituting the control system according to an embodiment.

FIG. 3 is a schematic diagram showing a hardware configuration example of the control unit 100 constituting the control system 2 according to the present embodiment. With reference to FIG. 3, the control unit 100 includes, as main components, a processor 102 such as a CPU (Central Processing Unit) and a GPU (Graphical Processing Unit), a chipset 104, a main storage device 106, a secondary storage device 108, a communication controller 110, a USB (Universal Serial Bus) controller 112, a memory card interface 114, network controllers 116, 118, and 120, an internal bus controller 122, and an indicator 124.

The processor 102 reads various programs stored in the secondary storage device 108, and expands and executes the programs in the main storage device 106, so as to realize the control operation related to standard control and various processes as described later. The chipset 104 realizes the processing of the control unit 100 as a whole by mediating the exchange of data between the processor 102 and each component.

In addition to a system program, the secondary storage device 108 stores a control program that operates in an execution environment provided by the system program.

The communication controller 110 is in charge of exchanging data with the function unit 300. As the communication controller 110, for example, a communication chip corresponding to Ethernet or the like can be adopted.

The USB controller 112 is in charge of exchanging data with an arbitrary information processing device via USB connection.

The memory card interface 114 is configured so that a memory card 115 can be attached thereto and detached therefrom, and is capable of writing data such as the control program and various settings to the memory card 115 or reading data such as the control program and various settings from the memory card 115.

Each of the network controllers 116, 118, and 120 is in charge of exchanging data with an arbitrary device via a network. The network controllers 116, 118, and 120 may employ industrial network protocols such as EtherCAT (registered trademark), EtherNet/IP (registered trademark), DeviceNet (registered trademark), and CompoNet (registered trademark).

The internal bus controller 122 is in charge of exchanging data with the relay unit 200, one or a plurality of function units 300, and one or a plurality of function units 400 constituting the control system 2. A manufacturer-specific communication protocol may be used for the internal bus, or a communication protocol that is the same as or compliant with any of the industrial network protocols may be used.

The indicator 124 notifies an operating state or the like of the control unit 100, and is composed of one or a plurality of LEDs arranged on a surface of the unit.

FIG. 3 shows a configuration example in which the required functions are provided by the processor 102 executing programs, but some or all of these provided functions may be implemented by using a dedicated hardware circuit (for example, ASIC (Application Specific Integrated Circuit) or FPGA (Field-Programmable Gate Array)). Alternatively, the main part of the control unit 100 may be realized by using hardware that follows a general-purpose architecture (for example, an industrial personal computer based on a general-purpose personal computer). In this case, a plurality of OSs (Operating Systems) having different uses may be executed in parallel by using a virtualization technology, and the required applications may be executed on each OS.

(c2: Relay Unit 200)

Figure 4:
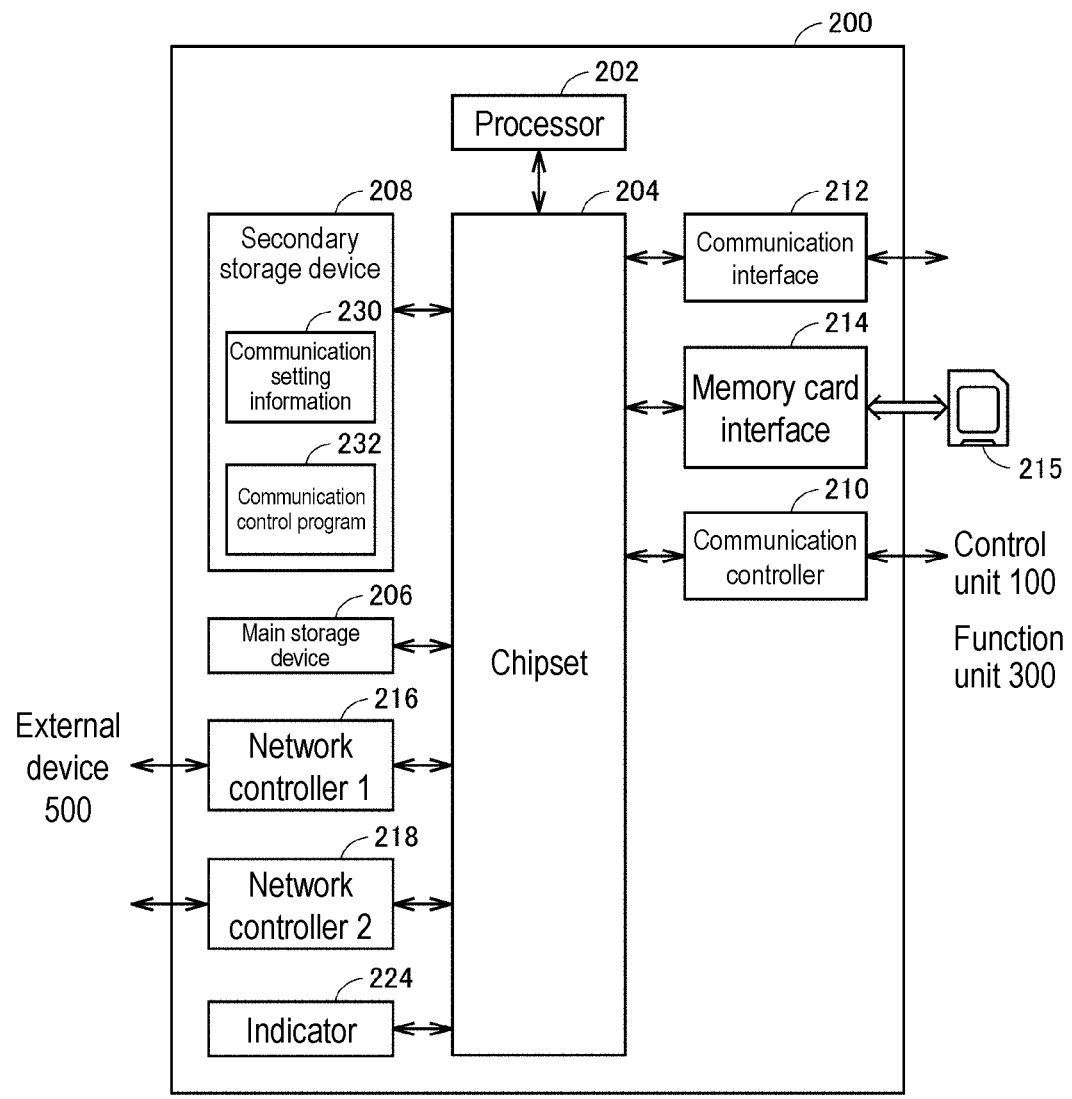
FIG. 4 is a schematic diagram showing a hardware configuration example of a relay unit constituting the control system according to an embodiment.

FIG. 4 is a schematic diagram showing a hardware configuration example of the relay unit 200 constituting the control system 2 according to the present embodiment. With reference to FIG. 4, the relay unit 200 includes, as main components, a processor 202 such as a CPU and a GPU, a chipset 204, a main storage device 206, a secondary storage device 208, a communication controller 210, a communication interface 212, a memory card interface 214, network controllers 216 and 218, and an indicator 224.

The processor 202 reads various programs stored in the secondary storage device 208, and expands and executes the programs in the main storage device 206, so as to realize various communication functions as described later. The chipset 204 realizes the processing of the relay unit 200 as a whole by mediating the exchange of data between the processor 202 and each component.

In addition to a system program, the secondary storage device 208 stores various data such as a communication control program 232 that operates in an execution environment provided by the system program, and communication setting information 230.

The communication controller 210 is in charge of exchanging data with the control unit 100 and the function unit 300. As the communication controller 210, for example, a communication chip corresponding to Ethernet or the like can be adopted.

The communication interface 212 is in charge of exchanging data with an arbitrary information processing device via USB connection.

The memory card interface 214 is configured so that a memory card 215 can be attached thereto and detached therefrom, and is capable of writing data such as the control program and various settings to the memory card 215 or reading data such as the control program and various settings from the memory card 215.

Each of the network controllers 216 and 218 is in charge of exchanging data with an arbitrary device via a network. The network controllers 216 and 218 may employ a general-purpose network protocol such as Ethernet. As an example, the relay unit 200 communicates with the external device 500 via the network controller 216 or the network controller 218.

The indicator 224 notifies an operating state or the like of the relay unit 200, and is composed of one or a plurality of LEDs arranged on a surface of the unit.

FIG. 4 shows a configuration example in which the required functions are provided by the processor 202 executing programs, but some or all of these provided functions may be implemented using a dedicated hardware circuit (for example, ASIC or FPGA). Alternatively, the main part of the relay unit 200 may be realized by using hardware that follows a general-purpose architecture (for example, an industrial personal computer based on a general-purpose personal computer). In this case, a plurality of OSs having different uses may be executed in parallel by using a virtualization technology, and the required applications may be executed on each OS.

(c3: Function Unit 300)

Figure 5:
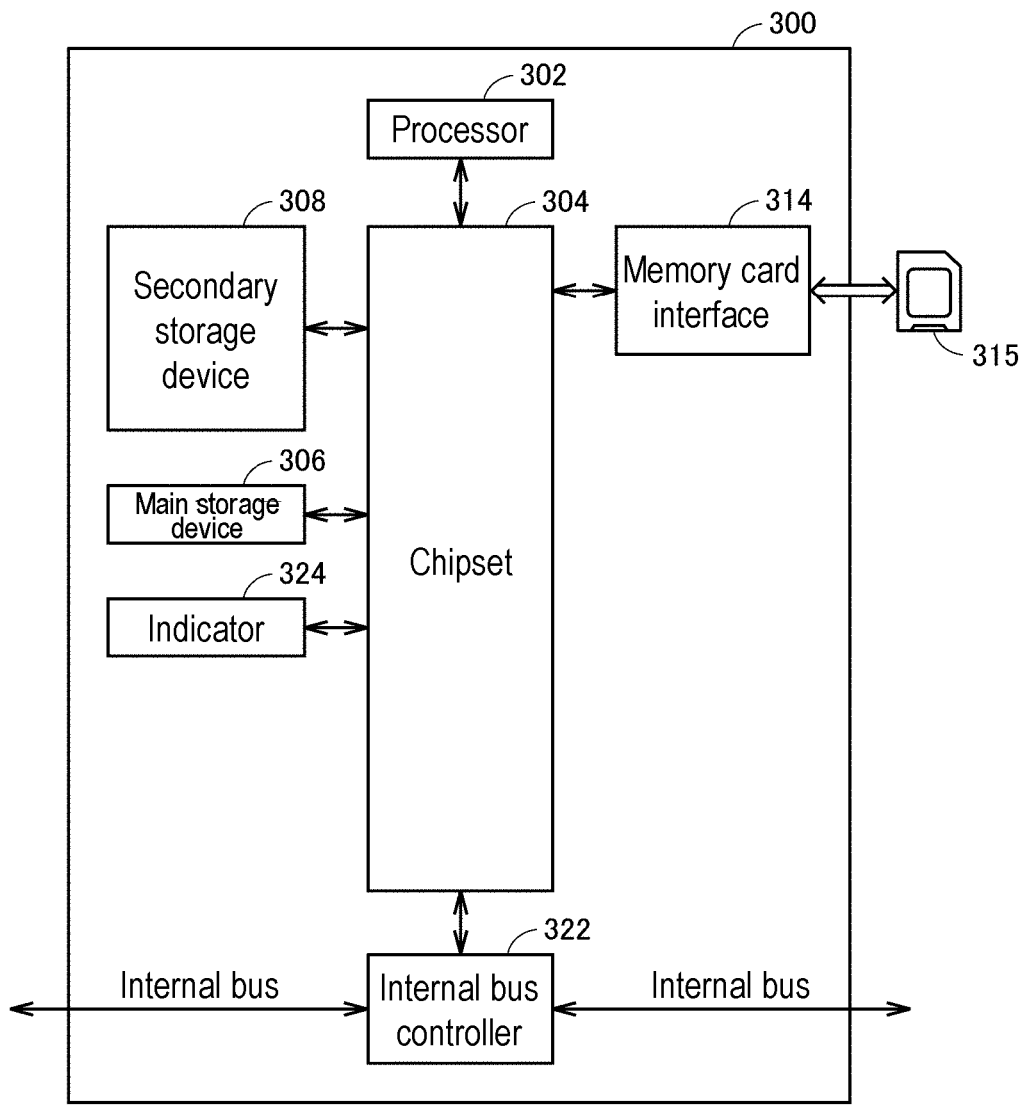
FIG. 5 is a schematic diagram showing a hardware configuration example of a function unit constituting the control system according to an embodiment.

FIG. 5 is a schematic diagram showing a hardware configuration example of the function unit 300 constituting the control system 2 according to the present embodiment. With reference to FIG. 5, the function unit 300 includes, as main components, a processor 302 such as a CPU and a GPU, a chipset 304, a main storage device 306, a secondary storage device 308, a memory card interface 314, an internal bus controller 322, and an indicator 324.

The processor 302 reads various application programs stored in the secondary storage device 308, and expands and executes the application programs in the main storage device 306, so as to realize a server function and various functions. The chipset 304 realizes the processing of the function unit 300 as a whole by mediating the exchange of data between the processor 302 and each component.

In addition to a system program, the secondary storage device 308 stores an application program that operates in an execution environment provided by the system program.

The memory card interface 314 is configured so that a memory card 315 can be attached thereto and detached therefrom, and is capable of writing data such as the application programs and various settings to the memory card 315 or reading data such as the application programs and various settings from the memory card 315.

The internal bus controller 322 is in charge of exchanging data with the control unit 100 and the relay unit 200 via an internal bus.

The indicator 324 notifies an operating state or the like of the function unit 300, and is composed of one or a plurality of LEDs arranged on a surface of the unit.

FIG. 5 shows a configuration example in which the required functions are provided by the processor 302 executing the programs, but some or all of these provided functions may be implemented by using a dedicated hardware circuit (for example, ASIC or FPGA). Alternatively, the main part of the function unit 300 may be realized by using hardware that follows a general-purpose architecture (for example, an industrial personal computer based on a general-purpose personal computer). In this case, a plurality of OSs having different uses may be executed in parallel by using a virtualization technology, and the required applications may be executed on each OS.

D. Hardware Configuration Example of External Device 500

Figure 6:
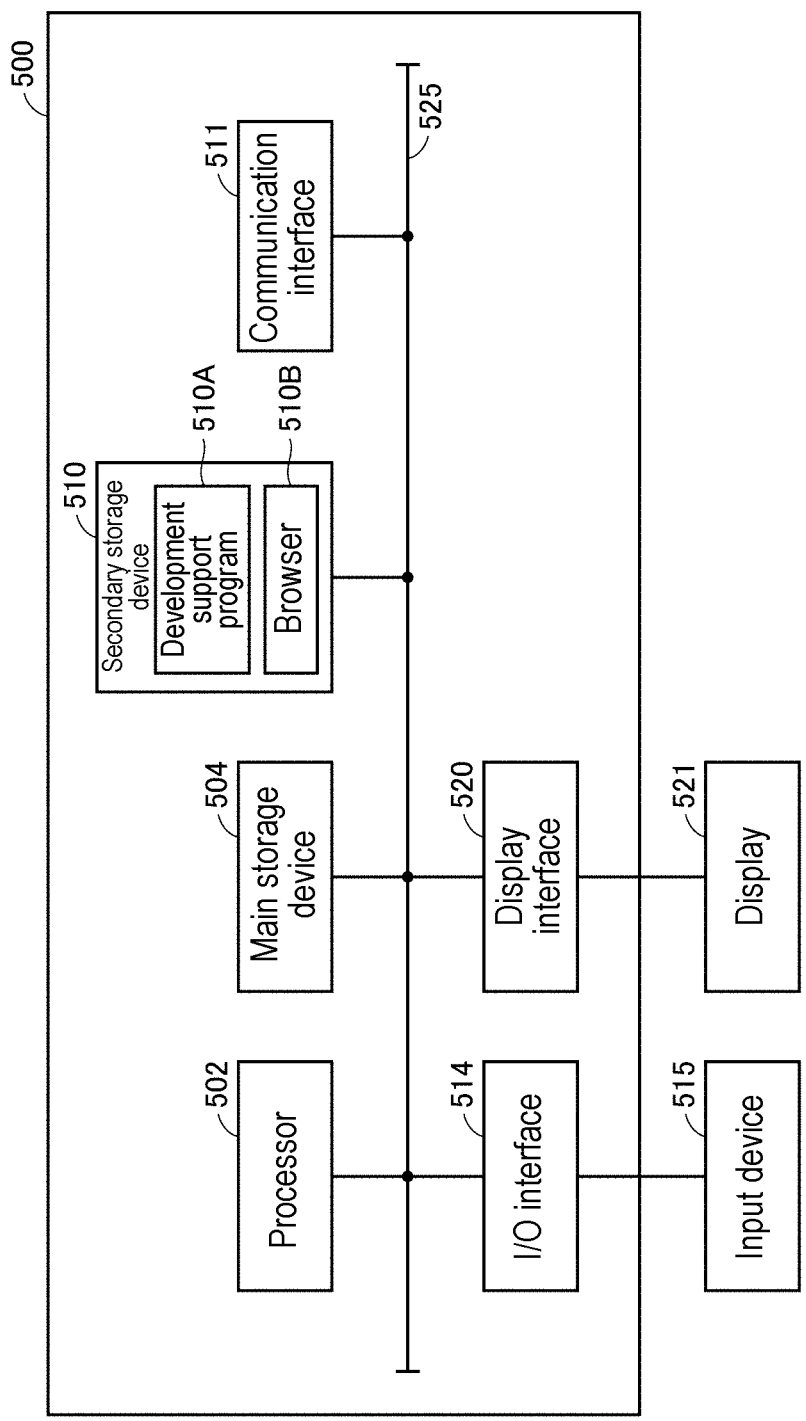
FIG. 6 is a schematic diagram showing a hardware configuration example of an external device constituting the information processing system according to an embodiment.

Next, a hardware configuration of the external device 500 will be described in order with reference to FIG. 6. FIG. 6 is a schematic diagram showing a hardware configuration example of the external device 500 constituting the information processing system 1 according to an embodiment.

As an example, the external device 500 is composed of a computer configured according to a general-purpose computer architecture. The external device 500 includes a processor 502 such as a CPU and an MPU, a main storage device 504, a secondary storage device 510, a communication interface 511, an I/O (Input/Output) interface 514, and a display interface 520. These components are communicably connected to each other via an internal bus 525.

The processor 502 controls the operation of the external device 500 by executing various control programs such as a development support program 510A and a browser application (not shown). The development support program 510A is a program that provides an environment for developing the control program (user program) of the control system 2. Based on receiving an execution instruction of various control programs such as the development support program 510A and the browser application, the processor 502 reads the control program to be executed from the secondary storage device 510 to the main storage device 504.

The communication interface 511 exchanges data with another communication device via a network. The another communication device includes, for example, the relay unit 200, a server, etc. The external device 500 may be configured to be capable of downloading various control programs such as the development support program 510A from the another communication device via the communication interface 511.

The I/O interface 514 is connected to an input device 515 and captures a signal indicating a user operation from the input device 515. The input device 515 typically includes a keyboard, a mouse, a touch panel, a touch pad, etc., and receives the operation from the user. In the example of FIG. 6, the external device 500 and the input device 515 are shown as separate parts, but the external device 500 and the input device 515 may be integrally configured.

The display interface 520 is connected to a display 521 and sends an image signal for displaying an image to the display 521 according to a command from the processor 502 or the like. The display 521 is, for example, an LCD (Liquid Crystal Display) or an organic EL (Electro Luminescence), and presents various information to the user. The display 521 may display various screens provided by the development support program 510A. In the example of FIG. 6, the external device 500 and the display 521 are shown as separate parts, but the external device 500 and the display 521 may be integrally configured.

E. Unit Configuration Example of Information Processing System 1

Figure 7:
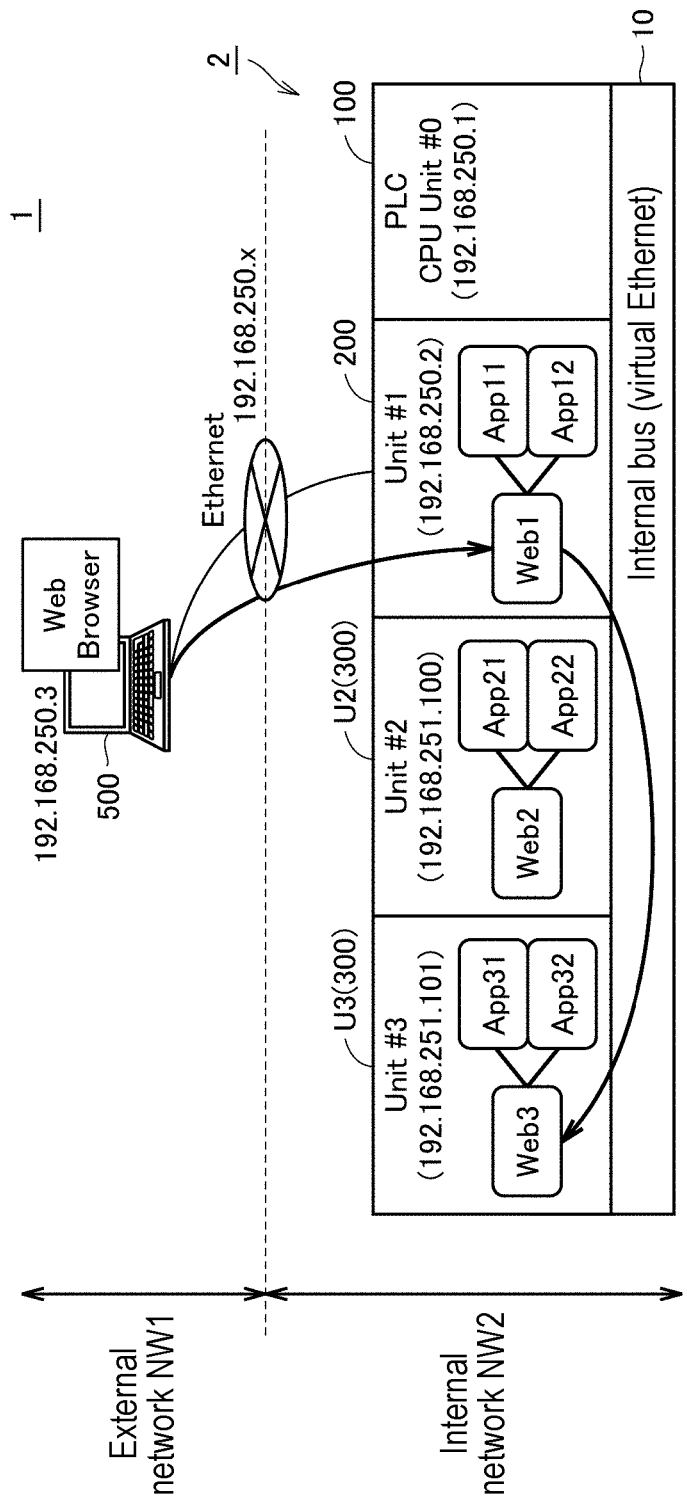
FIG. 7 is a diagram showing an example of a unit configuration of the information processing system according to an embodiment.

FIG. 7 is a diagram showing an example of a unit configuration of the information processing system 1. A specific example of the unit configuration of the information processing system 1 will be described with reference to FIG. 7.

As shown in FIG. 7, the information processing system 1 includes the control system 2 and the external device 500. The control system 2 includes the control unit 100, the relay unit 200, and the function unit 300. The control unit 100, the relay unit 200, and the function unit 300 are connected via the internal bus 10. These units communicate with each other via the internal bus 10. The communication is realized by, for example, virtual Ethernet.

The relay unit 200 and the external device 500 are connected to the external network NW1. An IP address "192.168.250.3" is assigned to the external device 500. The relay unit 200 and the external device 500 each have a physical communication port, and are connected to the external network NW1 via the communication port.

The control unit 100, the relay unit 200, and the function unit 300 are connected to the internal network NW2. A virtual IP address "192.168.250.1" is assigned to the control unit 100. Further, a unit name "Unit #0" is assigned to the control unit 100.

An IP address "192.168.250.2" is assigned to the relay unit 200. Further, a unit name "Unit #1" is assigned to the relay unit 200. The relay unit 200 functions as a Web server "Web1". Applications "App11" and "App12" are installed in the relay unit 200. The applications "App11" and "App12" are accessed from the Web server "Web1".

In the example of FIG. 7, the function unit 300 is composed of two function units U2 and U3. A virtual IP address "192.168.251.100" is assigned to the function unit U2. Further, a unit name "Unit #2" is assigned to the function unit U2. The function unit U2 functions as a Web server "Web2". Applications "App21" and "App22" are installed in the function unit U2. The applications "App21" and "App22" are accessed from the Web server "Web2".

A virtual IP address "192.168.251.101" is assigned to the function unit U3. Further, a unit name "Unit #3" is assigned to the function unit U3. The function unit U3 functions as a Web server "Web3". Applications "App31" and "App32" are installed in the function unit U3. The applications "App31" and "App32" are accessed from the Web server "Web3".

The relay unit 200 has a reverse proxy function. More specifically, the relay unit 200 functions as a Web server when receiving an access request from the external device 500. Then, the relay unit 200 rewrites the access request received from the external device 500, and transmits the rewritten access request to the function unit 300 of the access destination. At this time, the relay unit 200 functions as a client, and the function unit 300 of the access destination functions as a Web server. In this way, the relay unit 200 functions as both a Web server and a client.

F. Method of Generating Communication Setting Information 230

The relay unit 200 needs to route the access request from the external device 500 in order to relay the communication between the external device 500 and the function units U2 and U3. In order to realize such a relay function, the relay unit 200 generates the communication setting information 230 (see FIG. 1) for routing in advance.

Figure 8:
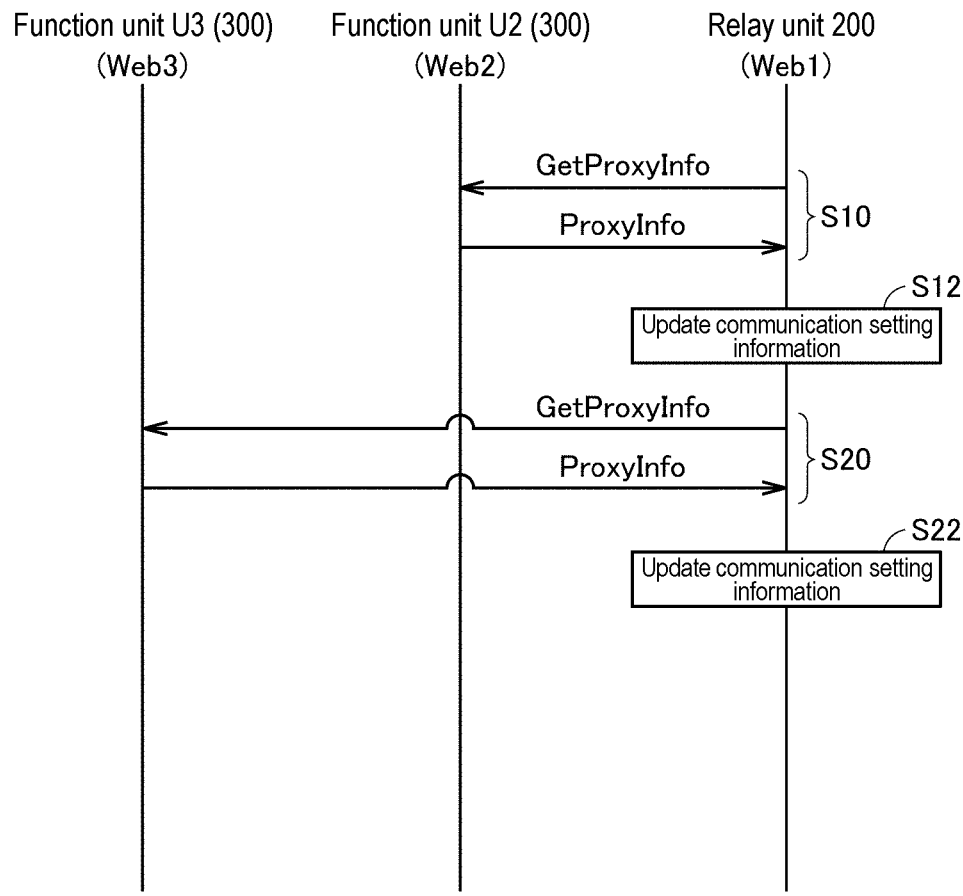
FIG. 8 is a diagram showing a data flow between the relay unit and the function unit during generation of communication setting information.
Figure 10:
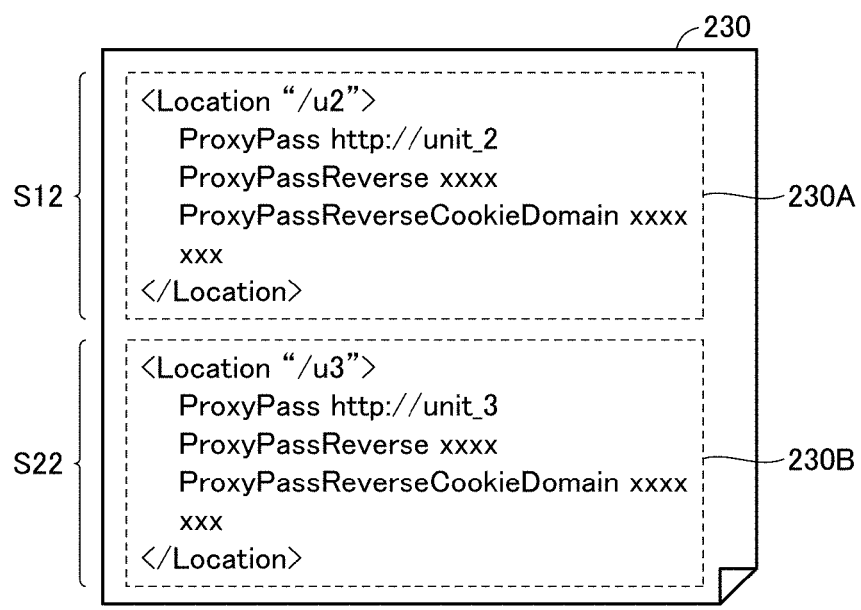
FIG. 10 is a diagram showing an example of the communication setting information.

Hereinafter, a method of generating the communication setting information 230 will be described with reference to FIG. 8 to FIG. 10. FIG. 8 is a diagram showing a data flow between the relay unit 200 and the function unit 300 during generation of the communication setting information 230. The process shown in FIG. 8 is executed, for example, when the control unit 100 is started.

In step S10, the relay unit 200 transmits an acquisition request for information about the function unit U2 (hereinafter, also referred to as "proxy information") to the function unit U2. The function unit U2 receives the acquisition request, and transmits its own proxy information to the relay unit 200.

FIG. 9 is a diagram showing an example of the proxy information transmitted in step S10. The proxy information includes, for example, a domain name, a unit name, and a host name. In the example of FIG. 9, the domain name is shown as "A1", the unit name is shown as "#2", and the host name is shown as "Unit 2".

In step S12, the relay unit 200 functions as the setting unit 252 (see FIG. 1) described above, and updates the communication setting information 230 based on the proxy information received from the function unit U2. FIG. 10 is a diagram showing an example of the communication setting information 230. In step S12, information shown by a broken line 230A is added to the communication setting information 230. As a result, the address information of the function unit U2 (in the example of FIG. 10, the host name "Unit 2") is associated with the identifier "u2".

The identifier "u2" associated with the host name "Unit 2" is generated according to a predetermined rule by the relay unit 200. Preferably, the relay unit 200 generates a character string as the identifier that makes it easy for the user to identify the function unit U2. As an example, the identifier is generated based on the domain name of the function unit U2, the unit name of the function unit U2 or the host name of the function unit U2.

The address information associated with the identifier "u2" is not necessarily the host name if the address information can specify the IP address of the function unit U2 in the internal network NW2. As an example, the address information associated with the identifier "u2" may be the IP address itself of the function unit U2 in the internal network NW2, or may be the domain name of the function unit U2.

In step S20, the relay unit 200 transmits an acquisition request for proxy information to the function unit U3. The function unit U3 receives the acquisition request, and transmits its own proxy information to the relay unit 200.

In step S22, the relay unit 200 functions as the setting unit 252 (see FIG. 1) described above, and updates the communication setting information 230 based on the proxy information received from the function unit U3. In step S22, information shown by a broken line 230B in FIG. 10 is added to the communication setting information 230. As a result, the address information of the function unit U3 (in the example of FIG. 10, the host name "Unit 3") is associated with the identifier "u3". The identifier "u3" is generated by the relay unit 200 according to the same rule as the identifier "u2".

The address information associated with the identifier "u3" is not necessarily the host name if the address information can specify the IP address of the function unit U3 in the internal network NW2. As an example, the address information associated with the identifier "u3" may be the IP address itself of the function unit U3 in the internal network NW2, or may be the domain name of the function unit U3.

G. Display Process of Portal Site

The external device 500 displays a portal site for accessing the application of each unit in the control system 2. By displaying such a portal site, the user can use the application of each unit without ascertaining the information of each unit in the control system 2 (for example, the IP address, etc. of each unit).

Figure 11:
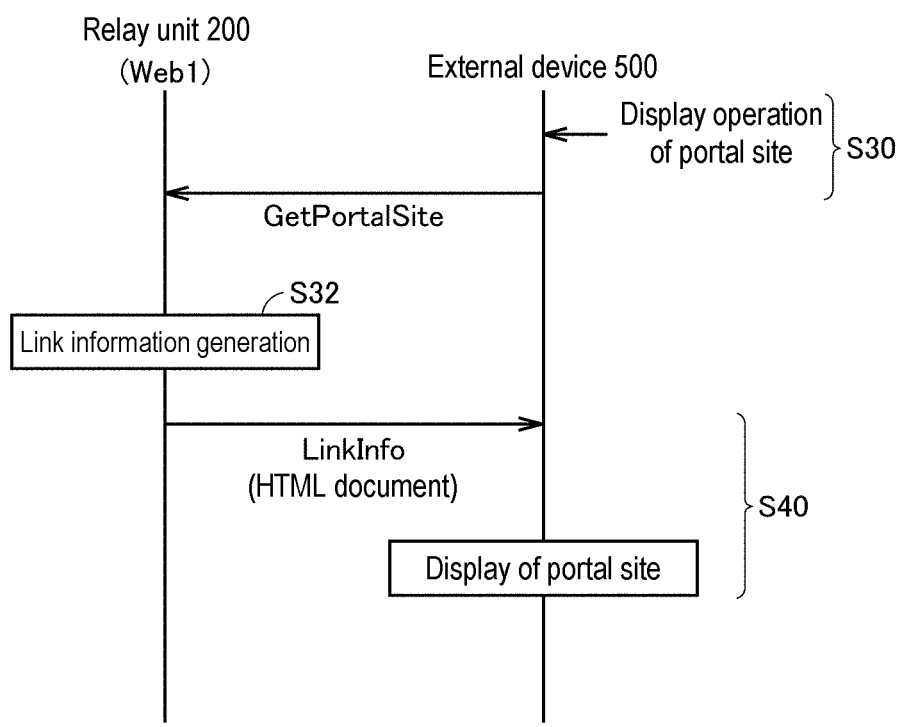
FIG. 11 is a diagram showing a data flow between the relay unit and the external device during display of a portal site.
Figure 13:
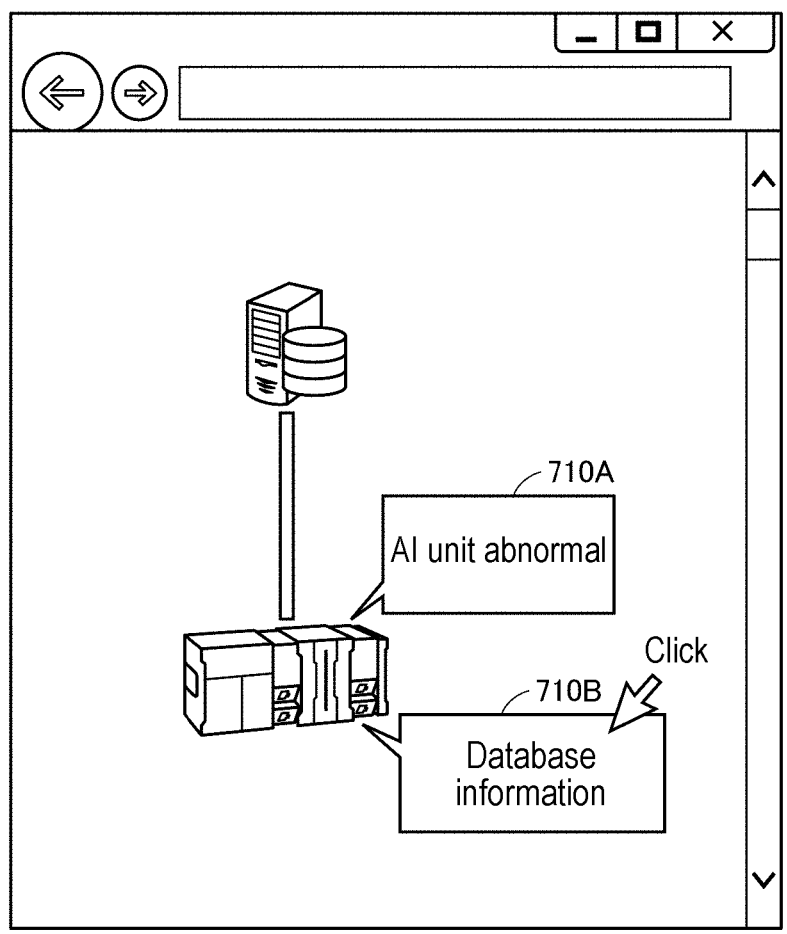
FIG. 13 is a diagram showing the portal site displayed on the external device according to an embodiment.

Hereinafter, a display flow of the portal site will be described with reference to FIG. 11 to FIG. 13. FIG. 11 is a diagram showing a data flow between the relay unit 200 and the external device 500 during display of the portal site.

In step S30, it is assumed that the user has performed a display operation of the portal site on the external device 500 by using the input device 515 (see FIG. 6). Based on this, the external device 500 transmits an acquisition request for the portal site to the relay unit 200.

In step S32, the relay unit 200 receives the acquisition request for the portal site from the external device 500, and functions as the link information generation unit 254 (see FIG. 1) described above and generates link information for accessing the application of each unit. FIG. 12 is a diagram showing the link information 30 generated in step S32.

The link information 30 is described in HTML. The link information 30 includes a valid URL 31 in the external network NW1, and a hyperlink 32. The hyperlink is some kind of character string associated with a URL.

The link information 30 is generated based on the communication setting information 230 (see FIG. 10) described above. More specifically, the relay unit 200 generates the link information based on its own address information (for example, an IP address) and the identifier of each unit defined in the communication setting information 230. In the example of FIG. 12, based on the IP address "192.168.250.2" of the relay unit 200 and the identifier "u3" of the function unit U3 defined in the communication setting information 230, a valid URL "http://192.168.250.2/u3/App31/index.php" is generated in the external network NW1. "App31" shown in the URL is the identifier of the application in the function unit U3. The relay unit 200 generates such a URL for each application in each unit of the control system 2, and writes the URL in the link information 30.

In step S40, the relay unit 200 functions as the communication unit 250 (see FIG. 1) described above, and transmits the generated link information 30 to the external device 500. The external device 500 configures the portal site based on the received link information 30, and displays the portal site on the display 521 (see FIG. 6). FIG. 13 is a diagram showing a portal site 710 displayed on the external device 500.

A link to each unit is shown as a hyperlink on the portal site 710. In the example of FIG. 13, the link to the function unit U2 is shown as a hyperlink 710A, and the link to the function unit U3 is shown as a hyperlink 710B.

The content displayed on the portal site 710 may be changed according to an access right of the user who has logged in to the external device 500. The access right given to each user is set in advance in the external device 500, etc., for example, and is transmitted to the control system 2 as user-specific access right information. Further, in each of the function units 300, the type of the access right that permits access is set for each application, and each of the function units 300 holds the type of the access right as application-specific access right information.

On this premise, in steps S10 and S20 of FIG. 8, each of the function units 300 transmits the application-specific access right information to the relay unit 200 when transmitting the proxy information (see FIG. 9) to the relay unit 200. The relay unit 200 stores the received application-specific access right information.

Thereafter, in step S30 of FIG. 11, when transmitting the acquisition request for the portal site to the relay unit 200, the external device 500 also transmits login information (for example, user ID) to the external device 500. The relay unit 200 specifies the type of the access right given to the logged-in user based on the user-specific access right information. Then, the relay unit 200 specifies the application (or function unit) that can be accessed with the access right of the logged-in user based on the application-specific access right information. Thereafter, the relay unit 200 generates link information only for the specified application. As a result, the content displayed on the portal site 710 is changed according to the access right given to the user.

H. Reverse Proxy Process

Figure 14:
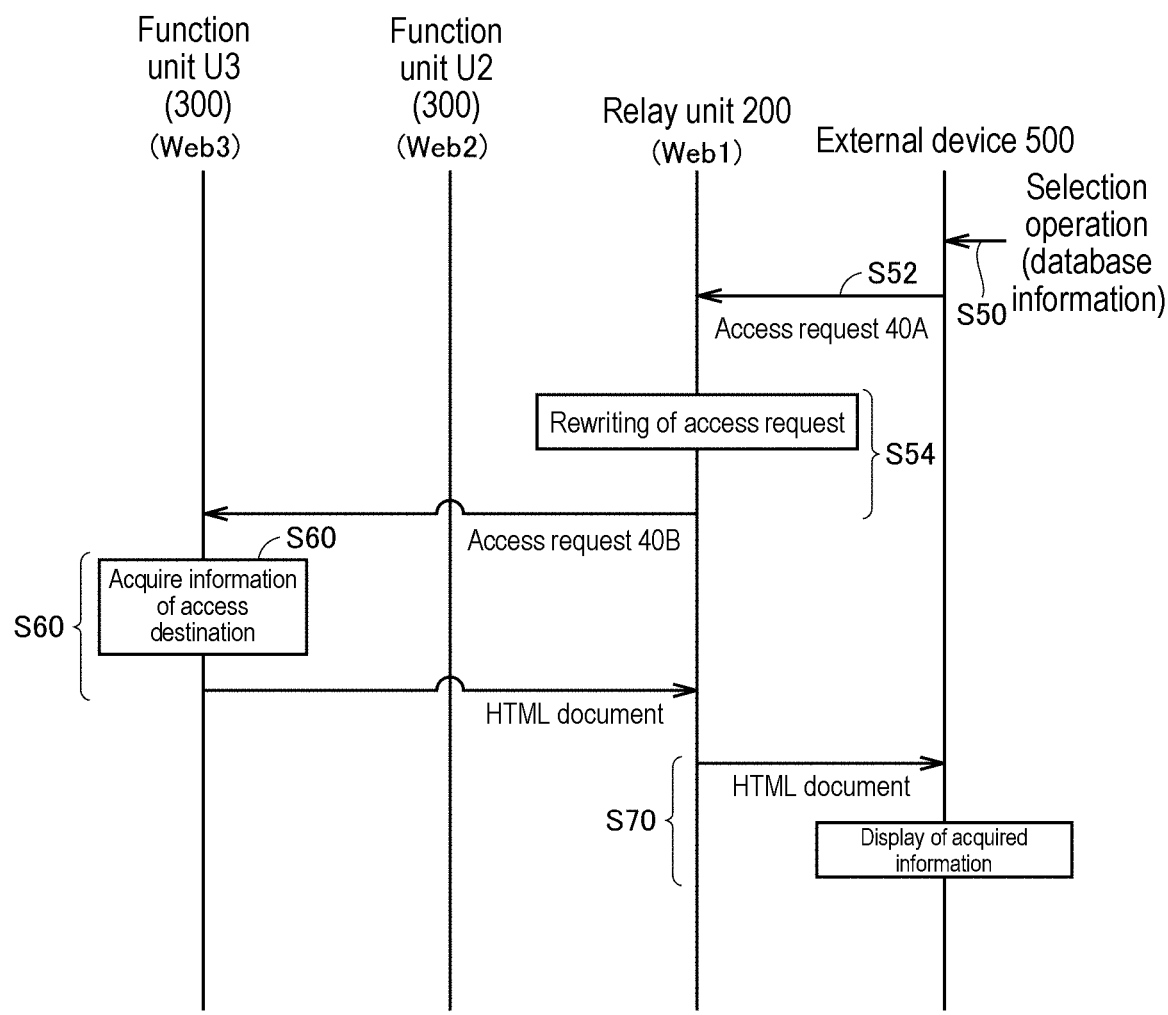
FIG. 14 is a diagram showing a data flow between the relay unit, the function unit, and the external device during a proxy response.

Next, the reverse proxy function of the relay unit 200 will be described with reference to FIG. 14 to FIG. 16. FIG. 14 is a diagram showing a data flow between the relay unit 200, the function unit 300, and the external device 500 during a proxy response.

Figure 15:
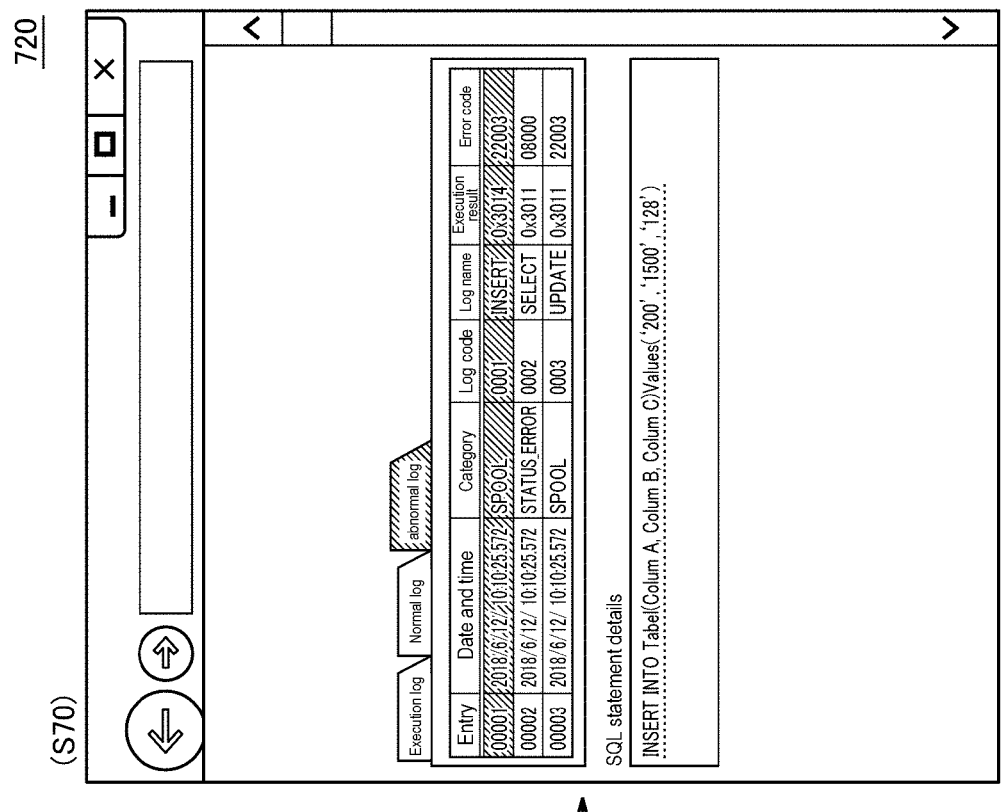
FIG. 15 is a diagram showing an example of screen transition of the portal site.
Figure 15:
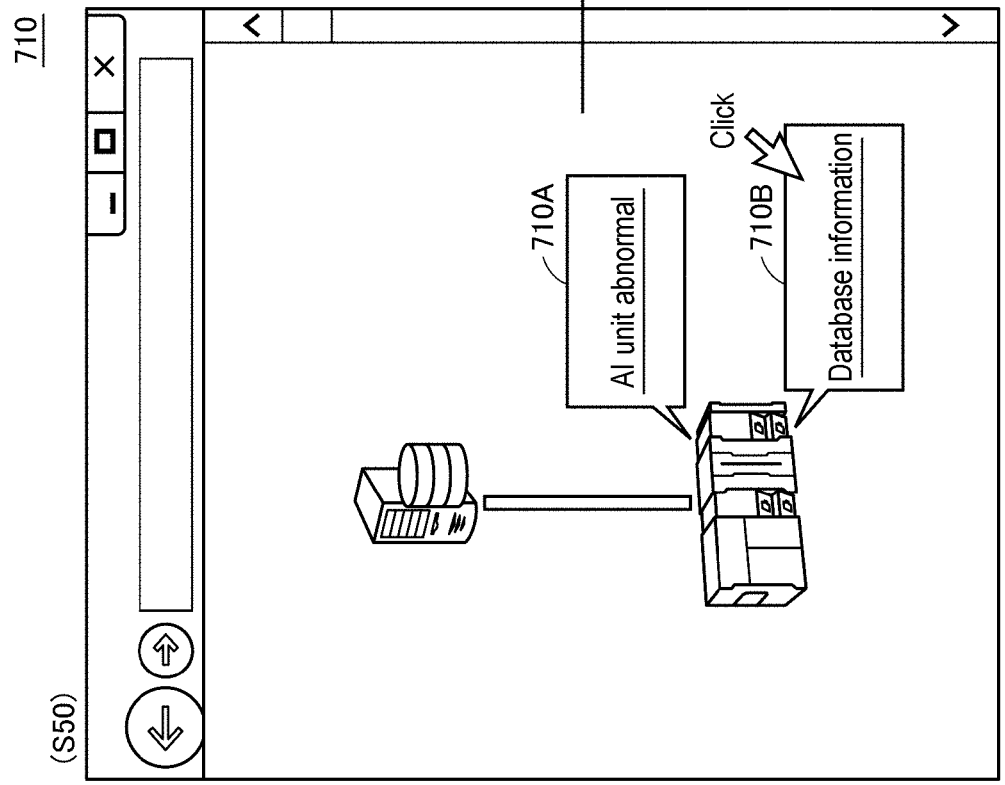

In step S50, it is assumed that the external device 500 is displaying the portal site 710 shown in FIG. 15. FIG. 15 is a diagram showing an example of screen transition of the portal site 710. The user can select any of the hyperlinks in the portal site 710. In step S50, for example, it is assumed that the hyperlink 710B of the portal site 710 is selected.

In step S52, the external device 500 transmits an access request corresponding to the selected hyperlink 710B to the relay unit 200. The access request includes a URL associated with the selected hyperlink 710B.

In step S54, the relay unit 200 functions as the communication unit 150 (see FIG. 1) described above, acquires the URL included in the access request received from the external device 500, and rewrites the URL. FIG. 16 is a diagram schematically showing a rewriting process of the URL.

Figure 16:
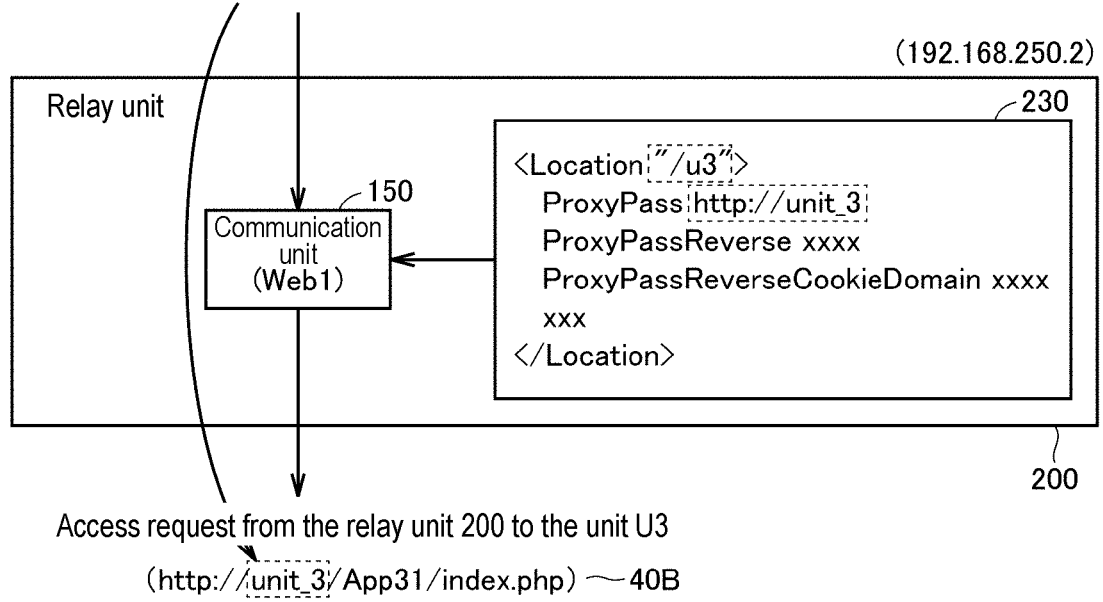
FIG. 16 is a diagram schematically showing a rewriting process of a URL (Uniform Resource Locator).

In FIG. 16, an access request 40A from the external device 500 is shown as the URL "http://192.168.250.2/u3/App31/index.php". "192.168.250.2" shown in the access request 40A indicates the IP address of the relay unit 200. "u3" shown in the access request 40A indicates the identifier of the unit of the access destination. "App31" shown in the access request 40A indicates the application of the unit of the access destination.

The communication unit 150 acquires the identifier "u3" included in the access request 40A based on receiving the access request 40A (first access request) from the external device 500. Next, the communication unit 150 acquires the address information corresponding to the identifier "u3" with reference to the communication setting information 230 described with reference to FIG. 10 described above. As a result, the valid address information "unit 3" in the internal network NW2 is specified. Thereafter, the communication unit 150 rewrites the access request 40A and generates an access request 40B (second access request) including the address information "unit 3".

More specifically, the communication unit 150 generates the access request 40B by replacing the identifier "u3" included in the access request 40A with the address information "unit_3" corresponding to the identifier "u3". At this time, the domain "192.168.250.2" (that is, destination information) included in the access request 40A is deleted. As a result, the access request 40A "http://192.168.250.2/u3/App31/index.php" is rewritten to the access request 40B "http://unit_3/App31/index.php", and the destination is rewritten from the relay unit 200 to the function unit U3. The communication unit 150 transmits the rewritten access request 40B to the function unit U3.

In step S60, the function unit U3 accesses the application in the function unit U3 based on the access request 40B received from the relay unit 200, and acquires the target information via the application. The function unit U3 transmits the acquired information as an HTML document to the relay unit 200.

In step S70, the relay unit 200 functions as a Web server again, and transmits the HTML document received from the function unit U3 to the external device 500. The external device 500 analyzes the received HTML document and displays a screen corresponding to the HTML document on the display 521 (see FIG. 6). FIG. 13 shows a screen 720 displayed in step S70.

As described above, the user clicks the hyperlink 710B whereby the external device 500 accesses the function unit U3 corresponding to the hyperlink 710B and acquires the target information from the function unit U3. At this time, the user does not need to ascertain the IP address of the function unit U3 which is the access destination.

Further, the link information displayed on the portal site 710 only includes the identifier of the function unit 300 in the external network NW1, and the IP address of the function unit 300 in the internal network NW2 is not included. That is, the IP address of the function unit 300 in the internal network NW2 is not disclosed to the external device 500. As a result, the function unit 300 belonging to the internal network NW2 is concealed. In addition, direct communication between the external device 500 and the function unit 300 is prevented, and the security risk associated with the communication is reduced.

I. First Modified Example of Information Processing System 1

Figure 17:
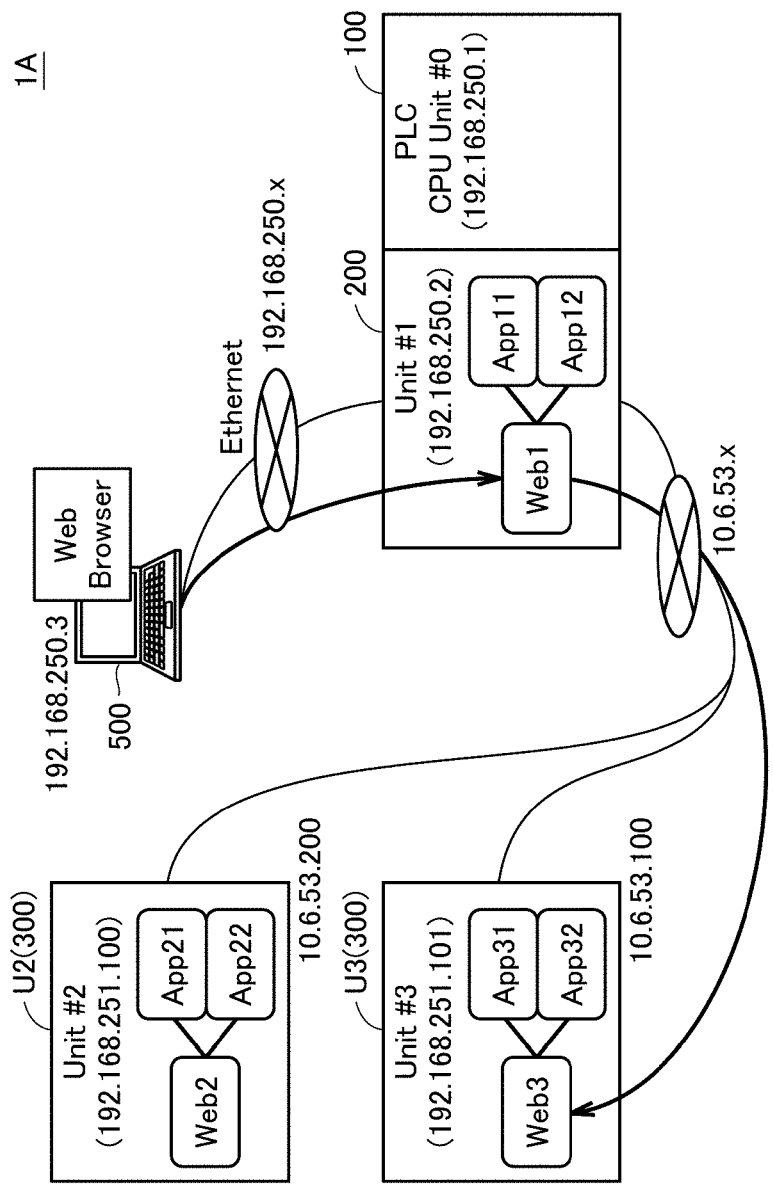
FIG. 17 is a diagram showing a unit configuration of an information processing system according to the first modified example.

FIG. 17 is a diagram showing a unit configuration of an information processing system 1A according to the first modified example. The unit configuration of the information processing system 1A will be described with reference to FIG. 17.

In FIG. 7 described above, each unit constituting the information processing system 1 is connected via the internal bus 10. In contrast thereto, in the information processing system 1A according to the first modified example, each unit is connected to the internal network NW2 via the communication port. That is, in this modified example, each unit is installed at a physically separated place. Even such a unit configuration does not deviate from the gist of the invention.

J. Second Modified Example of Information Processing System 1

Figure 18:
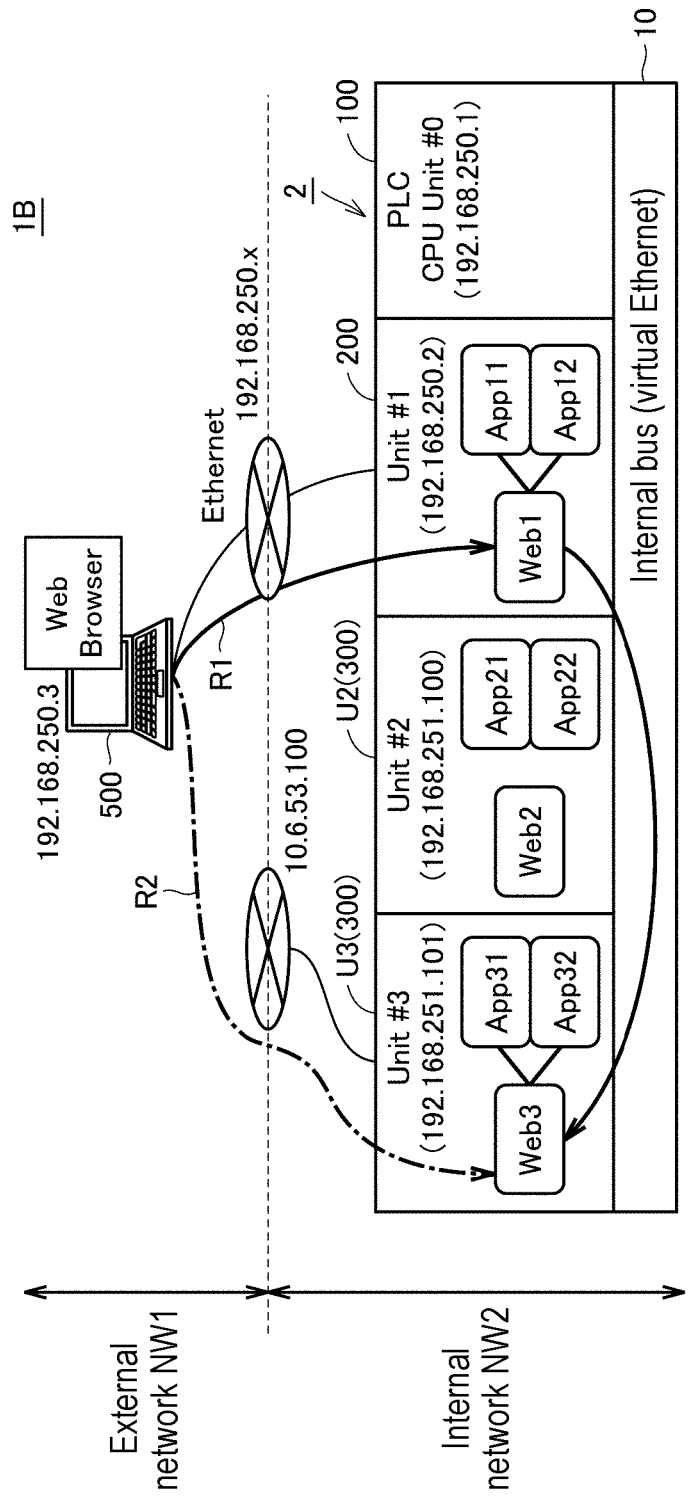
FIG. 18 is a diagram showing a unit configuration of an information processing system according to the second modified example.

FIG. 18 is a diagram showing a unit configuration of an information processing system 1B according to the second modified example. The unit configuration of the information processing system 1B will be described with reference to FIG. 18.

In the information processing system 1 shown in FIG. 7 described above, only the relay unit 200 is connected to the external network NW1. In contrast thereto, in the information processing system 1B according to the second modified example, not only the relay unit 200 but also other units are connected to the external network NW1. That is, in this modified example, not only the relay unit 200 but also other function units can directly communicate with the external device 500. Even such a unit configuration does not deviate from the gist of the invention.

In the example of FIG. 18, not only the relay unit 200 is directly connected to the external device 500, the function unit U3 is also directly connected to the external device 500. That is, in the communication path from the external device 500 to the function unit U3, a communication path R1 via the relay unit 200 and a communication path R2 not via the relay unit 200 exist.

With existence of a plurality of communication paths, permission/prohibition of access to each application is switched according to the communication path. As an example, for the application "App31" of the function unit U3, communication on the communication path R2 is prohibited, and only communication on the communication path R1 is permitted. On the other hand, for the application "App32" of the function unit U3, communication on the communication path R1 is prohibited, and only communication on the communication path R2 is permitted.

More specifically, the access permission/prohibition rule is defined in advance for each communication path and each application, and is held in each of the function units 300 as a permission/prohibition rule. When receiving the access request from the relay unit 200 or the external device 500, the function unit 300 specifies the access source from the URL included in the access request, and specifies the communication path based on the access source. Thereafter, the function unit 300 determines whether or not access to the application of the access destination is permitted for the specified communication path by referring to the permission/prohibition rule.

K. Appendix

As described above, the present embodiment includes the following disclosure.

[Configuration 1]
A unit (200) connectable to a PLC (Programmable Logic Controller) (100), the unit including: a communication unit (250) for relaying communication between an external device (500) connected to a first network and an other unit (300) connected to a second network; a setting unit (252) for acquiring address information of the other unit (300) in the second network from the other unit (300), and generating setting information (230) in which the address information is associated with an identifier that substitutes for the address information; and a link information generation unit (254) generating link information used for accessing information in the other unit (300) from the external device (500) based on the identifier.

[Configuration 2]
The unit according to configuration 1, wherein the communication unit (250):
based on receiving a first access request that is generated by the external device (500) based on the link information from the external device (500), acquires the identifier included in the first access request,
acquires the address information corresponding to the identifier with reference to the setting information (230), and
accesses information in the other unit (300) based on a second access request including the address information.

[Configuration 3]
The unit according to configuration 2, wherein the communication unit (250) generates the second access request by replacing the identifier included in the first access request with the address information.

[Configuration 4]
The unit according to any one of configurations 1 to 3, wherein the unit (200) is connected to the other unit (300) by a bus (10), and
the communication unit (250) communicates with the other unit (300) by using the bus (10).

[Configuration 5]
The unit according to any one of configurations 1 to 4, wherein the unit (200) further includes a communication port that is physical, and
the communication unit (250) communicates with the external device (500) by using the communication port.

[Configuration 6]
The unit according to any one of configurations 1 to 4, wherein the link information includes a hyperlink, and
the communication unit (250) displays the hyperlink on the external device (500).

[Configuration 7]
A control method for a unit (200) connectable to a PLC (100), the control method including: a step of relaying communication between an external device (500) connected to a first network and an other unit (300) connected to a second network;
a step of acquiring address information of the other unit (300) in the second network from the other unit (300), and generating setting information (230) in which the address information is associated with an identifier that substitutes for the address information (S12, S22); and
a step of generating link information used for accessing information in the other unit (300) from the external device (500) based on the identifier.

[Configuration 8]
A non-transitory computer-readable recording medium, recording a control program for a unit (200) connectable to a PLC (100), the control program causing the unit (200) to execute:
a step of relaying communication between an external device (500) connected to a first network and an other unit (300) connected to a second network;
a step of acquiring address information of the other unit (300) in the second network from the other unit (300), and generating setting information (230) in which the address information is associated with an identifier that substitutes for the address information (S12, S22); and
a step of generating link information used for accessing information in the other unit (300) from the external device (500) based on the identifier.

It should be considered that the embodiments disclosed herein are exemplary in all respects and not restrictive. The scope of the invention is shown by the claims rather than the above description, and it is intended that all modifications within the meaning and scope equivalent to the claims are included.

What is claimed is:
1. A unit connectable to a PLC (Programmable Logic Controller), the unit comprising:
a communication unit for relaying communication between an external device connected to a first network and an other unit connected to a second network;
a setting unit for acquiring address information and access right information of the other unit in the second network from the other unit, and generating setting information in which the address information and the access right information are associated with an identifier that substitutes for the address information; and
a link information generation unit generating link information used for accessing information in the other unit from the external device based on the identifier,
wherein the link information comprises a hyperlink of each of one or more services provided by the other unit, and the communication unit is configured to:
based on receiving a first access request that includes login information of a user and is generated by the external device based on the link information from the external device, acquire the login information and the identifier included in the first access request;
acquire the address information and the access right information corresponding to the identifier with reference to the setting information;
specify access right of the user to each of the one or more services based on the login information and the access right information;
transmit information including the hyperlink of the services to which the user has the access right to the external device; and
access information in the other unit based on a second access request including the address information, in response to receiving a third access request to any service to which the user has access right from the external device.

2. The unit according to claim 1, wherein the communication unit generates the second access request by replacing the identifier included in the first access request with the address information.

3. The unit according to claim 2, wherein the unit is connected to the other unit by a bus, and
the communication unit communicates with the other unit by using the bus.

4. The unit according to claim 2, wherein the unit further comprises a communication port that is physical, and
the communication unit communicates with the external device by using the communication port.

5. The unit according to claim 2, wherein
the communication unit displays the hyperlink on the external device.

6. The unit according to claim 1, wherein the unit is connected to the other unit by a bus, and
the communication unit communicates with the other unit by using the bus.

7. The unit according to claim 6, wherein the unit further comprises a communication port that is physical, and
the communication unit communicates with the external device by using the communication port.

8. The unit according to claim 6, wherein
the communication unit displays the hyperlink on the external device.

9. The unit according to claim 1, wherein the unit further comprises a communication port that is physical, and
the communication unit communicates with the external device by using the communication port.

10. The unit according to claim 1, wherein
the communication unit displays the hyperlink on the external device.

11. A control method for a unit connectable to a PLC, the control method comprising:
a step of relaying communication between an external device connected to a first network and an other unit connected to a second network;
a step of acquiring address information and access right information of the other unit in the second network from the other unit, and generating setting information in which the address information and access right information are associated with an identifier that substitutes for the address information; and
a step of generating link information used for accessing information in the other unit from the external device based on the identifier, wherein the link information comprises a hyperlink of each of one or more services provided by the other unit, and
wherein the step of relaying communication comprises:
based on receiving a first access request that includes login information of a user and is generated by the external device based on the link information from the external device, acquiring the login information and the identifier included in the first access request;
acquiring the address information and the access right information corresponding to the identifier with reference to the setting information;
specifying access right of the user to each of the one or more services based on the login information and the access right information;
transmitting information including the hyperlink of the service to which the user has the access right to the external device; and
accessing information in the other unit based on a second access request including the address information in response to receiving a third access request to any service to which the user has the access right from the external device.

12. A non-transitory computer-readable recording medium, recording a control program for a unit connectable to a PLC, the control program causing the unit to execute:
a step of relaying communication between an external device connected to a first network and an other unit connected to a second network;
a step of acquiring address information and access right information of the other unit in the second network from the other unit, and generating setting information in which the address information and access right information are associated with an identifier that substitutes for the address information; and
a step of generating link information used for accessing information in the other unit from the external device based on the identifier, wherein the link information comprises a hyperlink of each of one or more services provided by the other unit, and
wherein the step of relaying communication comprises:
based on receiving a first access request that includes login information of a user and is generated by the external device based on the link information from the external device, acquiring the login information and the identifier included in the first access request;
acquiring the address information and the access right information corresponding to the identifier with reference to the setting information;
specifying access right of the user to each of the one or more services based on the login information and the access right information;
transmitting information including the hyperlink of the service to which the user has the access right to the external device; and
accessing information in the other unit based on a second access request including the address information in response to receiving a third access request to any service to which the user has the access right from the external device.

* * * * *